April 28, 1942.　　　　G. T. MEYERS　　　　2,281,524
GLASS BUILDING BLOCKS
Filed Nov. 25, 1940　　　　4 Sheets-Sheet 1

INVENTOR
George T. Meyers.
BY
ATTORNEYS

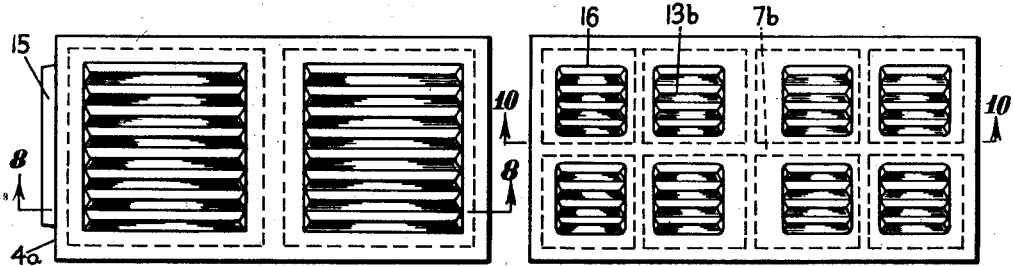
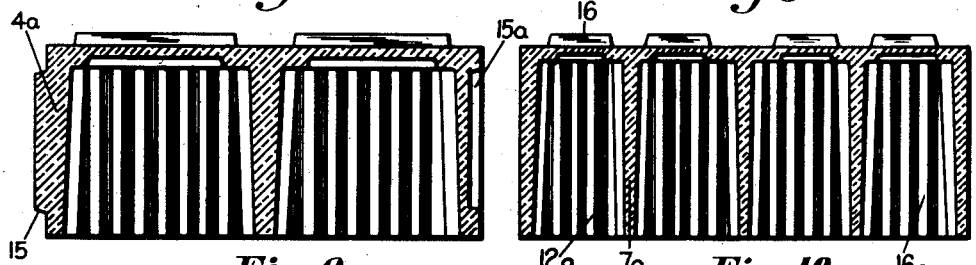
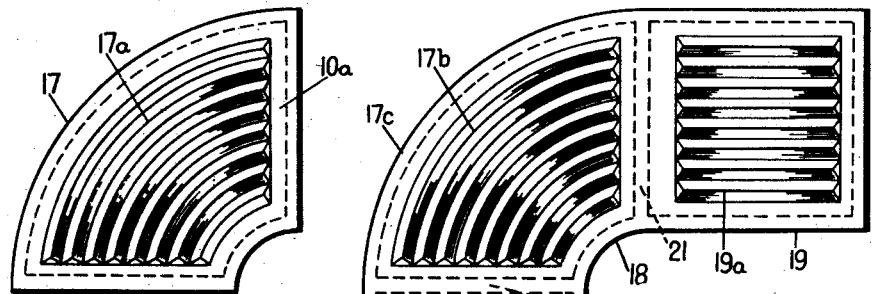
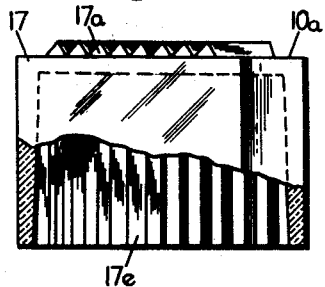

April 28, 1942.     G. T. MEYERS     2,281,524
GLASS BUILDING BLOCKS
Filed Nov. 25, 1940     4 Sheets-Sheet 3

INVENTOR
George T. Meyers.
BY
ATTORNEYS

April 28, 1942.                 G. T. MEYERS                  2,281,524
                             GLASS BUILDING BLOCKS
                           Filed Nov. 25, 1940          4 Sheets-Sheet 4
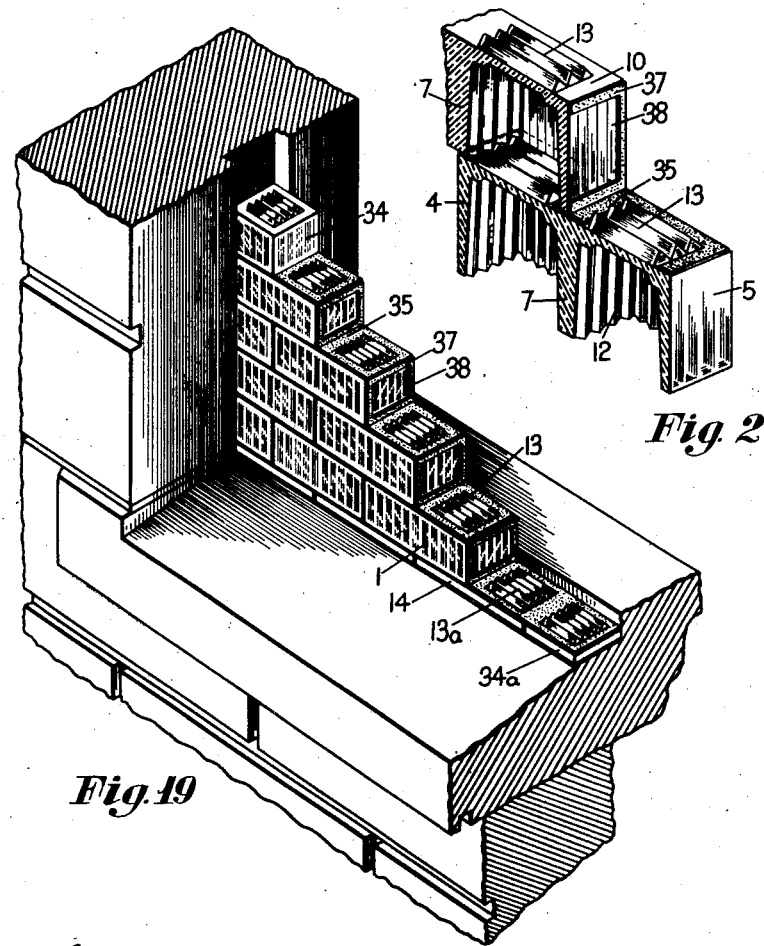
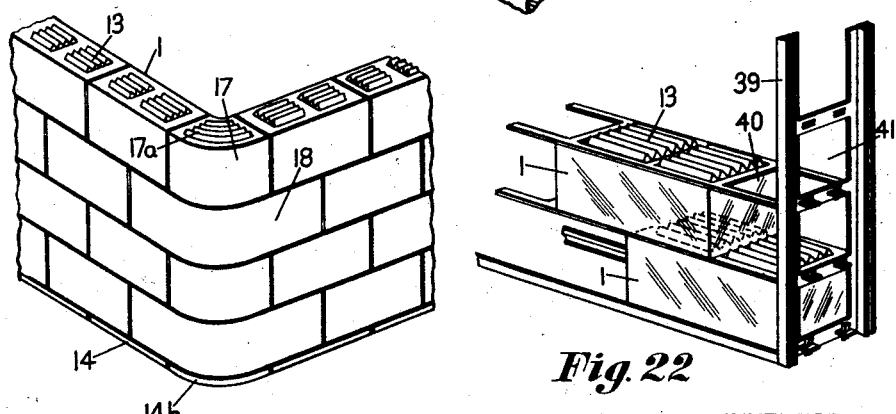
INVENTOR
George T. Meyers.
BY *Cabell, Mahoney & Miller*
ATTORNEYS Patented Apr. 28, 1942

2,281,524

UNITED STATES PATENT OFFICE 2,281,524

GLASS BUILDING BLOCK

George T. Meyers, Parkersburg, W. Va., assignor to The Meyers Company, Parkersburg, W. Va., a corporation of West Virginia Application November 25, 1940, Serial No. 367,043

3 Claims. (Cl. 72—42)

My invention relates to glass building blocks. It has to do, more particularly, with a block or brick or similar article made of glass which is adapted to be used in constructing outside building walls, inside partitions, et cetera.

At the present time, the most common type of glass brick or block consists of two halves which are molded separately and are then fused or bonded together. The fusing or bonding of the two halves requires complicated and costly operations. The two halves consist of a front half and a back half which are hollow and which have their edges adjacent each other forming a joint around the peripheral edge of the block intermediate the front and rear faces thereof. The fusing of the two halves at the joint is accomplished in such a manner that the joint interferes with the transmission of light through the edges of the block. Another disadvantage of glass bricks or blocks in common use at the present time is that they are laid up in full courses, that is, straight joints both horizontally and vertically are maintained. This method of laying blocks or bricks has never been considered good masonry when using bricks or blocks of other materials. Another disadvantage of glass bricks or blocks of the prior art resides in the fact that they have not had sufficient structural or load-bearing strength. Still another disadvantage of prior art glass blocks resides in the fact that they do not sufficiently diffuse light which strikes the exposed surface thereof but permit the light rays to pass directly through the blocks.

One of the objects of my invention is to provide a glass building block or brick which is molded in a single piece thereby eliminating the necessity of bonding or fusing sections together.

Another object of my invention is to provide a glass building block or brick which is of such a nature that light can readily pass through all edges thereof.

Another object of my invention is to provide a glass brick or block which is so designed that it may be laid according to good masonry methods.

Another object of my invention is to provide a glass brick or block which is so designed that it will have ample structural and load-bearing strength.

Another object of my invention is to provide a glass brick or block which is transparent or translucent and which is of such a nature that it will break up and diffuse light rays entering the block through the exposed surface thereof while permitting transmission of such rays therethrough.

Another object of my invention is to provide a glass brick or block which can be molded or formed with the ordinary equipment in use in glass plants in such a manner that substantially all strains and stresses will be eliminated from the finished glass brick or block.

Another object of my invention is to provide a glass brick or block that is inexpensive and that can be used either for exterior or interior use.

Another object of my invention is to provide a glass brick or block which will have the highest degree of compressive strength but will still have maximum thermal insulation properties.

Another object of my invention is to provide a glass building block of such a nature that when a number of such blocks are incorporated in a wall structure they will interlock with each other and produce a water-tight but very strong wall structure.

Another object of my invention is to provide a glass building block of the type indicated which is of such a nature that when a plurality of the blocks are incorporated in a wall structure, expansion and contraction of the blocks will be permitted without damage to the wall structure.

In its preferred form, my invention contemplates the provision of a transparent or translucent glass building block or brick which is molded in a single piece. This building block has a closed top, front, rear and end walls but the bottom is open. The building block is hollow but has one or more transversely extending load-supporting webs intermediate the ends of the block to give it sufficient compressive or load-bearing strength. On the upper surface of the top wall of each block, I provide projections which are adapted to interfit or interlock with sockets formed in the bottom wall of an adjacent block. Thus, each block is adapted to interlock with the block above it or below it. These interlocking portions are so disposed that the blocks of one course may be disposed in overlapping relationship to the block above or below it. If desired, the ends of adjacent blocks may also interlock with each other. By providing interlocking blocks, the wall structure will be extremely strong and may be made more water-tight. The interlocking arrangement is of such a nature that expansion and contraction of the blocks in all directions will be permitted when they are incorporated in a wall structure. Furthermore, the interlocking arrangement is such that, if desired, it is not necessary to use mortar or other plastic sealing material but instead compressible gaskets may be employed between the joints which will greatly simplify the building of the wall.

Each of the blocks is preferably provided with prisms which are so arranged that although transmission of light through the blocks will be permitted, the light will be diffused and distributed while passing through the blocks. These prisms are preferably disposed on surfaces of the block which are not exposed so that there will be no danger of them being chipped or collecting dirt.

Since the blocks are hollow they will have maximum thermal insulation properties. However, they will also have sufficient compressive strength. The blocks can be molded in such a manner that all wall surfaces will be of substantially uniform thickness so as to give the block uniform strength throughout, eliminating all strains and stresses.

The preferred embodiment of my invention is illustrated in the accompanying drawings wherein similar characters of reference designate corresponding parts and wherein:

Figure 7 is a top plan view of a block of such a design that the ends thereof will interlock with the ends of adjacent blocks.

Figure 8 is a longitudinal section taken substantially along line 8—8 of Figure 7.

Figure 9 is a top plan view of a modified form of my block.

Figure 10 is a longitudinal sectional view taken substantially along line 10—10 of Figure 9.

Figure 11 is a top plan view of a curved corner block adapted to be used with blocks of the type shown in Figure 1.

Figure 12 is an end view, partly broken away, of the block shown in Figure 11.

Figure 13 is a top plan view of a corner block adapted to cooperate with that shown in Figure 11.

Figure 19 is a perspective view of a portion of a wall structure constructed with my blocks.

Figure 20 is a view, partly in section and partly in perspective, illustrating how my blocks interlock with each other.

Figure 21 is a perspective view of a portion of a wall structure constructed with my blocks illustrating a corner structure.

Figure 22 is a perspective view illustrating how my blocks may be employed with metal frame members.

Figure 1:
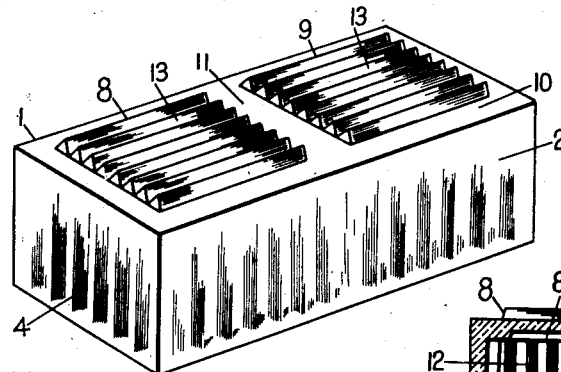
Figure 1 is a perspective view of a glass building block according to my invention.
Figure 2:
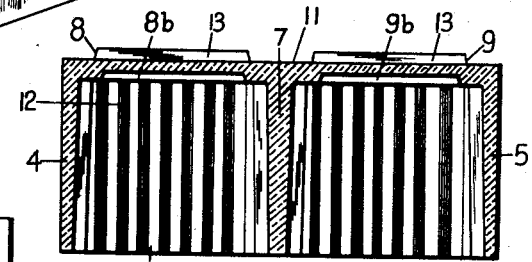
Figure 2 is a longitudinal vertical section taken through the block of Figure 1.
Figure 3:
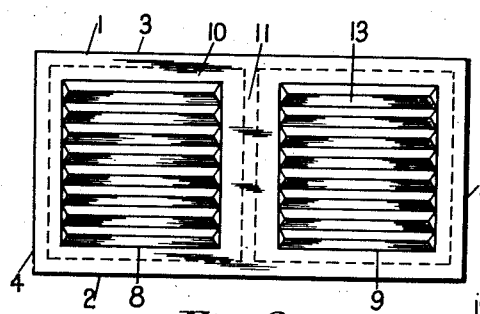
Figure 3 is a top plan view of the block shown in Figure 1.
Figure 4:
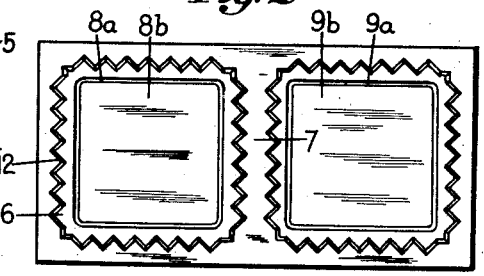
Figure 4 is a bottom plan view of the block.

With reference to the drawings, and particularly to Figures 1 and 4, I have illustrated a glass block which is of hollow construction. This glass block is substantially rectangular in horizontal cross-section and includes a top wall 1, a front wall 2, a rear wall 3, and end walls 4 and 5. The bottom 6 is open. Midway between the ends of the block, I provide a transversely extending load-supporting web 7 which is joined integrally with the top wall 1, the front wall 2, and the rear wall 3. This block may be formed by pressing it from molten glass in an ordinary mold. It will be noted that all of the interior wall surfaces taper in such a manner that the walls are of slightly less thickness at the lower open end of the block. This is to facilitate removal of the block from the mold. However, it will also be apparent that the walls are of substantially uniform thickness throughout to give the walls uniform strength and to eliminate strains and stresses.

When the block is formed in the mold, a pair of raised portions 8 and 9 are formed on the upper surface of the top wall 1. These raised portions are substantially square in outline and are of such size that they are spaced from each other and from all edges of the block. Thus, a flat load-bearing area 10 is provided adjacent the edges of the block and a flat load-bearing area 11 is provided between the portions 8 and 9 directly above the web 7. Thus, all of the load-bearing areas are directly above a vertical wall of the block. The open lower end of the block has a pair of sockets 8a and 9a formed by the arrangement of the outer walls of the block and the transverse web 7. These sockets 8a and 9a are slightly larger than the projecting portions 8 and 9. When a plurality of blocks are laid in a wall, the projecting portions 8 and 9 are adapted to fit into sockets 8a or 9a of the blocks disposed in the next course above, as will be explained more fully hereinafter. It will be noted that when the projecting portions 8 and 9 are formed, recesses 8b and 9b are formed on the lower surface of the top wall 1. This serves to save glass and also to keep the top wall of substantially uniform thickness throughout.

On the inner surfaces of the front wall 2, the rear wall 3, the end walls 4 and 5 and on both surfaces of the web 7, I preferably provide vertically disposed prisms 12. Also on the portions 8 and 9 I preferably provide longitudinally extending prisms 13. These prisms will permit the passage of light through the walls of the block but will serve to break it up and diffuse it rather than to permit the light rays to pass directly through the block. With the prisms 13 at right angles to the prisms 12, the light will be more effectively diffused.

Figure 5:
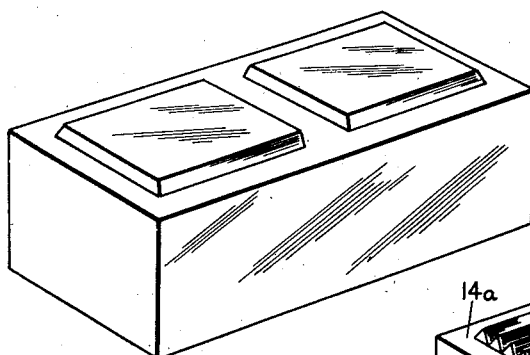
Figure 5 is a perspective view similar to Figure 1 but showing a block without the light prisms which are shown on the block of Figure 1.

In Figure 5 I illustrate a glass block which is exactly like that shown in Figure 1 with the exception that the prisms are omitted. This block has all the features of the block shown in Figure 1 with the exception that it will not diffuse the light as effectively.

Figure 6:
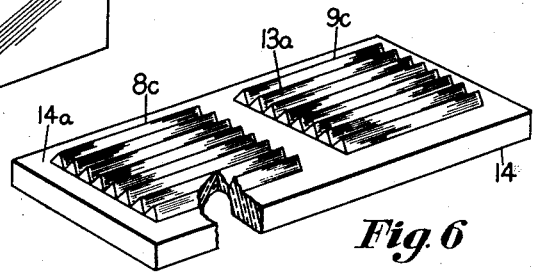
Figure 6 is a perspective view, partly broken away, of a base member which may be employed in starting the wall structure.

In Figure 6 I illustrate a base member 14 which is adapted to be laid first when building a wall of the blocks of the type shown in Figure 1. This member 14 comprises a glass plate 14a having raised portions 8c and 9c formed on the top surface thereof which are exactly the same as the portions 8 and 9 of the block found in Figure 1.

The prisms 13a, in this instance, will serve to reflect the light upwardly.

In Figures 7 and 8 I have illustrated a block which is the same as that shown in Figure 1 with the exception that means is provided for interlocking the ends of the adjacent blocks. For this purpose the end wall 4a of each block is provided with the projecting portion 15 which may be square or of any other outline. The opposite end wall 5a of the block is provided with a recess 15a of similar outline to the portion 15 but slightly larger. The portion 15 of one block is adapted to interfit with the recess 15a formed in the end of the adjacent block.

Figures 9 and 10 illustrate a modification of my block. In this instance, instead of providing the single transverse web 7, I provide a plurality of longitudinally spaced transverse webs 7a. Also I provide a longitudinally extending web 7b disposed between the front and rear walls of the block. The webs 7a and 7b serve to produce a plurality of properly spaced sockets 16a in the lower open end of the block. Formed on the top of the block are a plurality of similarly spaced projections 16. The projections 16 are adapted to interfit with the sockets 16a in a course of blocks above it when the blocks are incorporated in the wall. In this block also all of the load-bearing surfaces on the top wall of the block are disposed directly above a vertical wall of the block. All of the inner surfaces of the block are provided with vertically disposed prisms 12a. The projecting portions 16 of the block are provided with longitudinally extending prisms 13b.

Figure 11 illustrates a curved corner block 17 adapted to be employed with blocks of the type illustrated in Figure 1. This curved corner block is of hollow construction having an open lower end. It is provided with a projecting portion 17a on its upper surface which is spaced from the edge of the block to provide a load-bearing surface 10a entirely around the block.

Another corner block 18 adapted to be disposed in a row above or below the corner block 17 is illustrated in Figure 13. This block comprises a central curved section 17c corresponding to the curved block 17 of Figure 11. This block 18 has straight sections 19 and 20 disposed at right angles to each other and integrally connected to the section 17c. The section 17c has on its upper end a raised portion 17b adapted to fit into the open lower end 17e of the block 17. The straight sections 19 and 20 are provided with raised portions 19a and 20a which are adapted to fit into either of the sockets 8a and 9a of blocks of the type shown in Figure 1 when they are placed in superimposed relationship to the block of Figure 13. The raised portion 17b is slightly smaller than the socket 17e. The raised portions 19a and 20a are slightly smaller than the sockets 8a and 9a. The block 18 is provided with transversely extending webs 21 and 22 at the points where the curved sections 17c are joined to the straight sections 19 and 20. In this instance also, all of the load-bearing areas are directly above vertical walls of the block.

Figure 14:
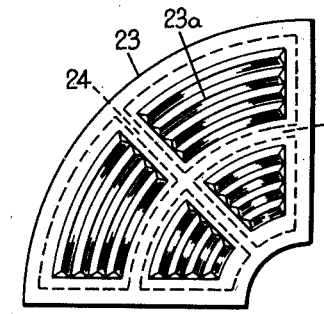
Figure 14 is a top plan view of a corner block adapted to be used with blocks of the type shown in Figure 9.
Figure 15:
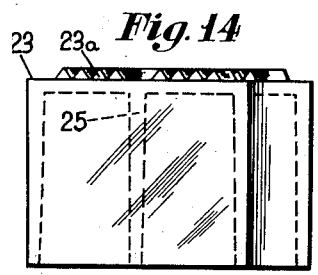
Figure 15 is an end view of the block shown in Figure 14.
Figure 16:
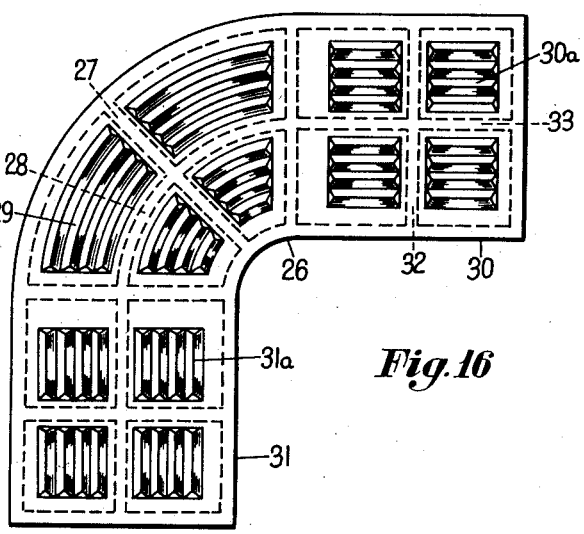
Figure 16 is a top plan view of a corner block adapted to be used in combination with that of Figure 14.

In Figures 14, 15 and 16, I have illustrated corner blocks for use with blocks of the type shown in Figures 9 and 10. The corner block 23 is exactly the same as the block 17 of Figure 11 with the exception that it has transverse webs 24 and longitudinal webs 25. Furthermore, the raised portion on the top is divided into a plurality of sections 23a.

The block 26 is exactly the same as that shown in Figure 13 with the exception that the curved section is provided with a transverse web 27 and longitudinal web 28. The raised portion on the top is divided into a plurality of sections 29 adapted to fit into the sockets formed in the lower open end of the block 23. The straight end sections 30 and 31 of this block are the same as the sections 19 and 20 with the exception that they are provided with additional transverse webs 32 and longitudinal webs 33. A plurality of raised portions 30a are provided on the section 30 and a plurality of raised portion 31a are provided on the section 31. The portions 30a or 31a are adapted to fit into the sockets 16a of blocks of the type shown in Figures 9 and 10 when they are disposed above this corner block.

Figure 18:
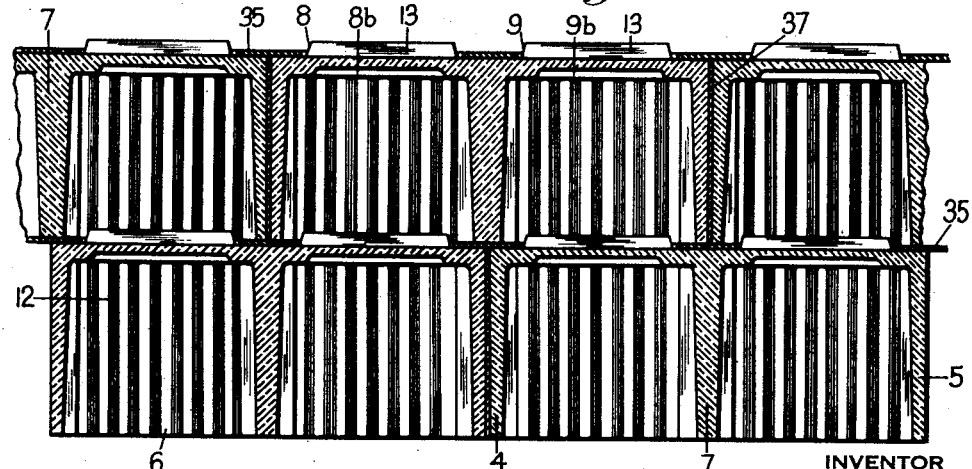
Figure 18 is a longitudinal vertical sectional view taken through a wall structure constructed with my blocks.

In Figures 18, 19 and 20, I have illustrated how a wall structure may be built with blocks of the type illustrated in Figure 1. The wall is started by first laying the base member 14. Then courses of the blocks are laid. As illustrated, the blocks may be laid so that the vertical joints will be staggered. In other words, one block in one row will overlap the two adjacent halves of two blocks in the next row. When laying the blocks in this manner, it will be desirable to provide some blocks in half sizes as indicated by the numeral 34 in Figure 19. Also the base member 14 should be made in half sizes 34a. It will be noted that the projecting portions 8 and 9 on the top surfaces of the blocks of one row will interfit with the sockets 8a and 9a formed in the lower ends of the blocks of the row disposed next above. This interfitting action will lock the blocks in all directions. However, since the portions 8 and 9 are slightly smaller than the sockets 8a and 9a, limited movement of the blocks relative to each other, caused by expansion or contraction, will be permitted.

Figure 17:
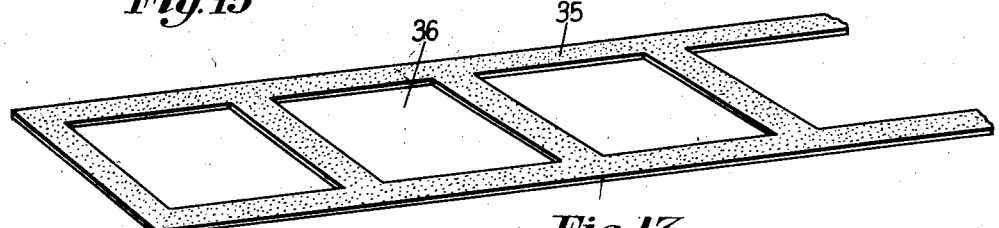
Figure 17 is a perspective view of a gasket which I may employ with my blocks.

If it is desired to seal the joints between the blocks, I prefer to employ compressible gaskets. These gaskets may be of any suitable material, for example, asphaltic material, which will tend to stick to the blocks. The gasket for the horizontal joints may be in strip form as illustrated in Figure 17. This strip gasket 35 preferably has spaced openings 36 which fit around the projections 8 and 9. As illustrated in Figures 18 and 19, similar gaskets 37 may be provided for the vertical joints. These gaskets 37 have a large opening 38 in the center so that the gaskets will not interfere with passage of light from one block to the other through the ends thereof. The gaskets being of compressible material will permit the expansion and contraction of the blocks.

Figure 21 illustrates a wall structure constructed of blocks of the type shown in Figure 1 and having a corner wherein blocks of the type shown in Figures 11, 12 and 13 are employed. In one row a corner block 18 is employed and in the next row a corner block 17 is employed. A curved corner base member 14b may also be employed which will have a top surface corresponding to the top surface of block 17.

In Figure 22 I have illustrated how blocks of the type shown in Figure 1 may be employed with metal frame members for inside partitions. These metal frame members 39 are vertically and horizontally disposed in the usual manner. They are provided with flanges on their outer ends which overlap the edges of the blocks. However, with the block which I have devised, the projecting portions 8 and 9 also function to lock the blocks in position. These projecting portions 8 and 9 not only interlock with the cooperating sockets in the adjacent blocks but also interlock with sockets 40 formed in the horizontal metal members. The openings 40 in the metal members are sufficiently large so as not to interfere with passage of light through the edges of the blocks. The vertical metal members are also preferably provided with openings 41 so as not to interfere with passage of light through the ends of the blocks. If desired, blocks of the type shown in Figures 7 and 8 may be employed and the projecting portions 15 may interlock with the openings 41.

It will be apparent from the above description that I have provided a glass building block having many advantages. It is molded in a single piece thereby eliminating the necessity of bonding or fusing sections together. It is of such a nature that it may be laid according to good masonry methods. It will have ample structural and load-bearing strength but will still have high insulating properties.. It can be made by inexpensive methods now in common use in glass factories for making other articles. It will be of uniform strength throughout and will have stresses and strains eliminated. It is of such a nature that it can be used for either exterior or interior use. When a plurality of such blocks are incorporated in a wall, a very sturdy structure will result due to the interlocking action. Also, the wall structure will be water-tight. Furthermore, it will be of such a nature that expansion and contraction of the blocks will be permitted without damage to the wall structure. The blocks are of such a nature that the light will be transmitted therethrough from all directions but will be diffused and broken up before passing through the block. Furthermore, it may be incorporated in a wall structure in combination with the gaskets in such a manner that the light may pass from one block to another.

Various other advantages will be apparent from the preceding description, the drawings and the following claims.

Having thus described my invention, what I claim is:

1. A glass building block comprising a hollow body portion having a top, front and rear walls, end walls and an open bottom, said hollow body portion having at least one transversely extended web joined to the front, rear and top walls, the interior surfaces of said walls having prisms formed thereon, said top wall having a plurality of raised portions formed on the upper surface thereof which are spaced from each other and from all edges of the block, said raised portions having prisms formed thereon which are disposed at right angles to said prisms on the other wall surfaces.

2. A wall structure made up of a plurality of glass blocks, each of said glass blocks comprising a hollow body portion of substantially rectangular form having a top wall, front and rear walls, end walls and an open bottom, said hollow body portion having a transversely extending web joined to the front, rear and top walls and being disposed at a point midway between the ends of said block, a plurality of raised portions formed on the upper surface of the top wall which are spaced from each other and from all edges of the block so as to provide load-bearing surfaces at the front, rear and end edges of the top wall which are disposed directly above said front, rear and end walls and a load-bearing surface between said raised portions which is disposed directly above said web, said blocks being disposed in horizontal rows with the vertical joints of adjacent rows in staggered relationship, the raised portions on the blocks of one row fitting into the open lower ends of the blocks of the adjacent row above so that the lower edges of the upper row of blocks will rest on said load-bearing surfaces of the lower row of blocks, and metal strips provided between said row of blocks, said strips having sockets through which the raised portions of said blocks pass.

3. A wall structure made up of a plurality of glass blocks, each of said blocks comprising a hollow body portion of substantially rectangular form having a top wall, front and rear walls, end walls and an open bottom, said hollow body portion having a transversely extending web joined to the front, rear and top walls and being disposed at a point midway between the ends of said block, a plurality of raised portions formed on the upper surface of the top wall which are spaced from each other and from all edges of the block so as to provide load-bearing surfaces at the front, rear and end edges of the top wall which are disposed directly above said front, rear and end walls and a load-bearing surface between said raised portions which is disposed directly above said web, said blocks being disposed in horizontal rows with the vertical joints of adjacent rows in staggered relationship, the raised portions on the blocks of one row fitting into the open lower ends of the blocks of the adjacent row above so that the lower edges of the upper row of blocks will rest on said load-bearing surfaces of the lower row of blocks, each of said blocks having a projecting portion on one end adapted to fit into a recess formed in the end of an adjacent block, metal strips provided between said row of blocks, said strips having sockets through which the raised portions of said blocks pass, said wall having half-blocks at the ends of alternate rows, and a vertically disposed metal strip at the end of the wall having sockets for receiving the projecting portions on the ends of the blocks.

GEORGE T. MEYERS.